Nov. 30, 1948.        L. A. KEMPTON        2,454,929
FLOW CONTROL
Filed July 17, 1944                2 Sheets-Sheet 1
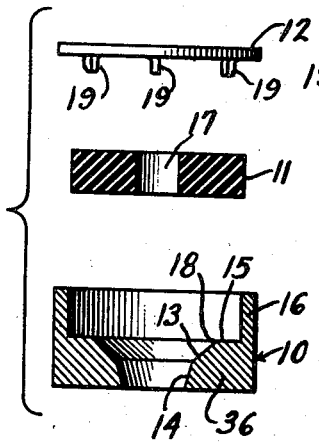
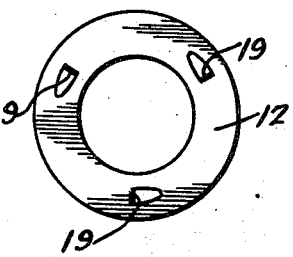
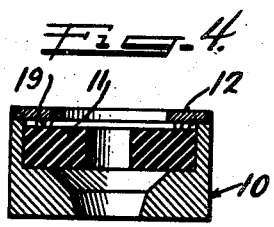
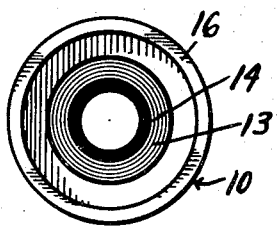
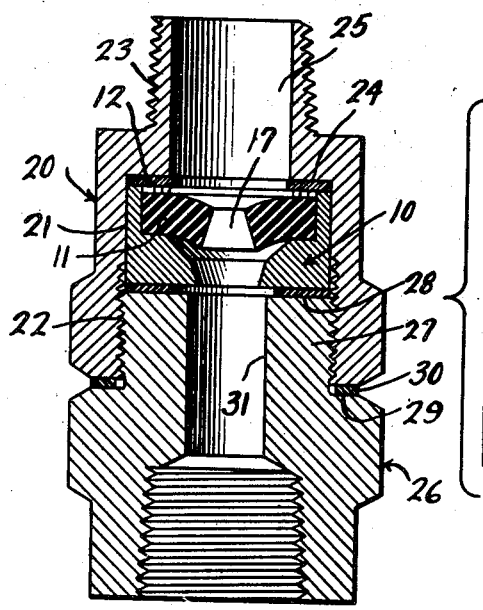
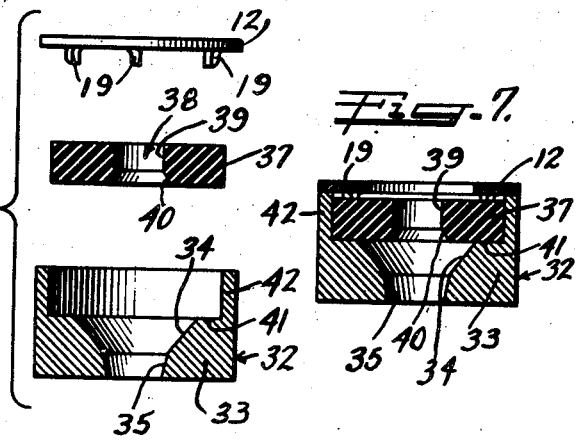
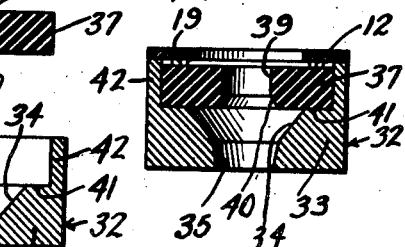
Inventor
LESLIE A. KEMPTON.

Nov. 30, 1948. L. A. KEMPTON 2,454,929
FLOW CONTROL
Filed July 17, 1944 2 Sheets-Sheet 2

Inventor
LESLIE A. KEMPTON.
by Charles F. Hill
Attys.

Patented Nov. 30, 1948

2,454,929

UNITED STATES PATENT OFFICE 2,454,929

FLOW CONTROL

Leslie A. Kempton, Chicago, Ill., assignor to The Dole Valve Company, Chicago, Ill., a corporation of Illinois Application July 17, 1944, Serial No. 545,312

7 Claims. (Cl. 138—45)

This invention relates to a flow control device and more particularly to a device for maintaining a substantially constant rate of fluid flow irrespective of wide variations in fluid pressure.

One of the principal features and objects of the present invention is to provide means for automatically maintaining a substantially constant rate of fluid flow in a fluid supply system irrespective of variations in inlet or outlet pressures.

A further object of the present invention is to provide a novel means for controlling the delivery of fluid in a fluid system.

Another object of the present invention is to provide a novel flow control unit which is economical to manufacture and which is rugged and reliable in use.

Another and further object of the present invention is to provide a flow control unit having a deformable resilient washer disposed on a seat whose inner edge is disposed radially outwardly from the orifice in the washer.

Still another object of the present invention is to provide a novel seating member for a constant rate of flow maintaining device.

Another and still further object of the present invention is to provide a novel seat and resilient annulus through which fluid is arranged to pass.

Still another and further object of the present invention is to provide a novel flow control device including a resilient disk-like member with an orifice of novel shape therein.

The novel features which I believe to be characteristic of my invention are set forth with particularity in the appended claims. My invention itself, however, both as to its manner of construction and method of operation, together with further objects and advantages, may best be understood by reference to the following description, taken in connection with the accompanying drawings, in which:

Figure 1 is an expanded or exploded view showing the three principal component parts of a flow control unit embodying the novel teachings of the present invention, including the seat, the resilient annular member and the retainer ring;

Figure 2 is a top view of the retainer ring shown in Figure 1;

Figure 3 is a top view of the seat shown in Figure 1;

Figure 4 is a vertical sectional view showing the three members of Figure 1 in assembled position;

Figure 5 is a vertical sectional view of a complete flow control unit and more particularly shows the assembled flow control elements of Figure 4 assembled in the socket of a coupling member;

Figure 6 is an expanded or exploded view similar to Figure 1 showing a modified form of the present invention;

Figure 7 shows a vertical sectional view of the elements of Figure 6 in assembled relationship;

Figure 8:
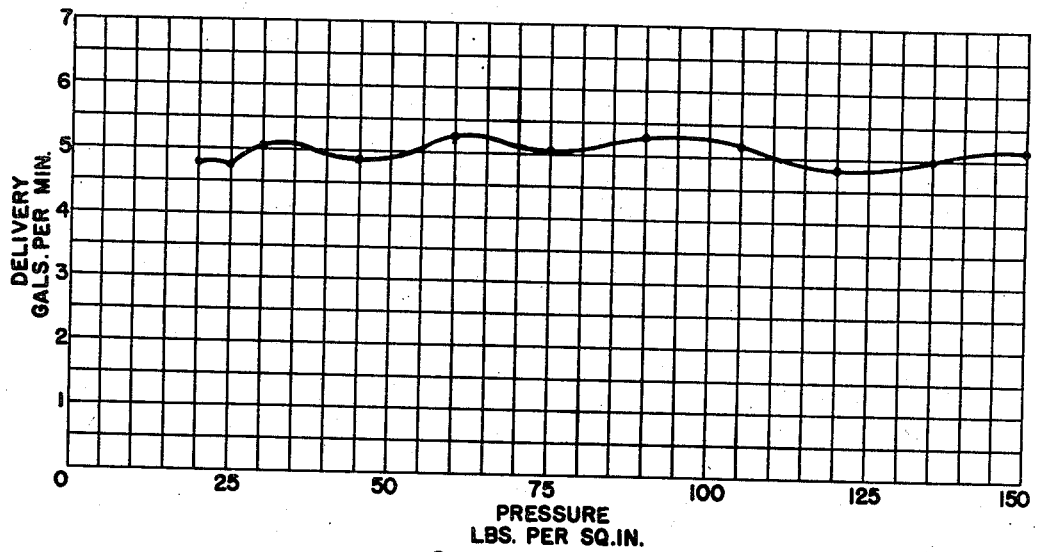
Figure 9:
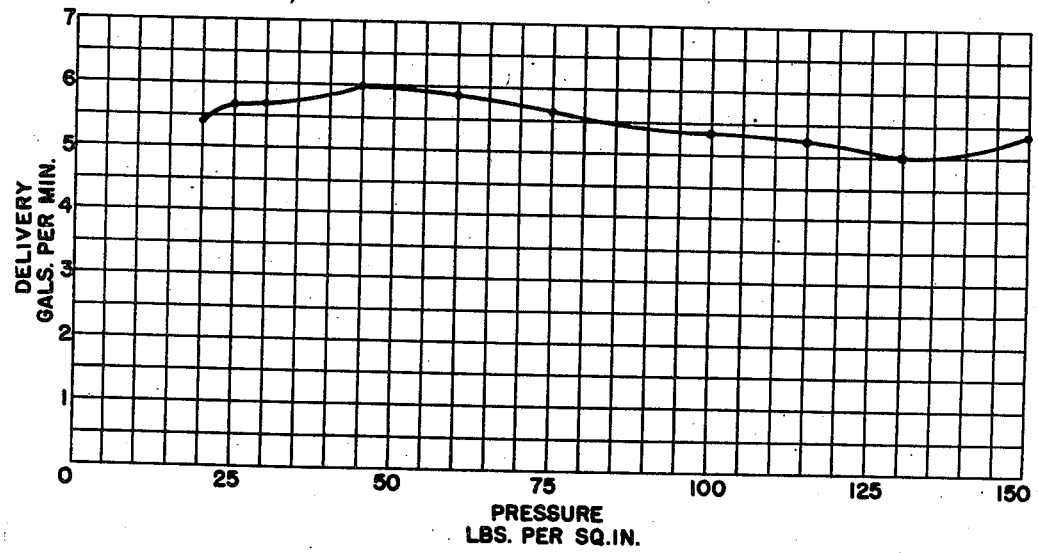

Figure 8 is a graph made from actual test data showing the delivery in gallons per minute with different pressure drops across the flow control unit of Figures 1 to 5, the pressure drop being varied from 20 pounds per square inch to 150 pounds per square inch; and Figure 9 is a graph made from actual test data of a device of the type shown in Figures 6 and 7 with the pressures varied from 20 pounds per square inch to 150 pounds per square inch.

Referring now to Figures 1 to 5 of the drawings there is shown therein a flow control device including a seat 10, a resilient annular member 11 and a retainer ring 12. The seat 10 includes a base portion 36, having a central opening therethrough formed of two frusto-conical surfaces 13 and 14. The frusto-conical surface 13 makes the greatest angle with respect to the central axis of the opening through the base 36 and may, by way of example, be approximately 40 to 50°. The frusto-conical surface 14 is disposed at an angle of approximately 15° with respect to the central axis of the opening through the base 36.

The frusto-conical surface 13 merges into the flat shoulder 15 which lies between the upper edge of the frusto-conical surface 13 and the annular lip or flange portion 16.

The resilient annular member 11 is generally in the shape of a washer or flat disk having a central opening 17 therein. The diameter of this central opening 17 is considerably smaller than the diameter of the inner marginal edge 18 of the shoulder 15.

The outside diameter of the resilient annular member 11 is such as to permit the member 11 to fit snugly within the annular lip or flange 16 of the seat 10 against the shoulder 15.

The retainer ring 12 is preferably in the form of a stamping of brass or other suitable material having punched out ears 19 which are arranged to project down against the resilient annular member 11 when the member 11 is in its assembled position within the seat member 10.

Members 10, 11 and 12 are assembled in a housing or coupling such, for example, as the coupling 20 shown in Figure 5. This coupling 20 includes a socket or bore 21 which is internally threaded near its outer end, as at 22. The coupling 20 also includes an externally threaded shank portion 23 at the end thereof opposite to the internally threaded bore portion 22. The diameter of the bore 21 is of such dimensions as to snugly receive the retainer ring 12 and the seat member 10, the retainer ring 12 being seated against the shoulder 24 which is formed at the inner end of the bore 21. The shank portion 23 is provided with a bore 25 which is axially aligned with the bore 21 and which opens into the latter.

The elements 10, 11 and 12 are retained in place by a coupling member 26 which is provided with an externally threaded shank portion 27 arranged to be threaded into the internally threaded bore portion 22. A gasket 28 is preferably disposed between the inner end of the shank portion 27 and the seat member 10 in order to make a fluid tight fit at this point. The coupling 26 is provided with an external shoulder 29 and this shoulder 29 is so positioned that when the shank portion 27 is threaded into position against the gasket or washer 28 and the seat member 10, a second gasket or washer 30 is slightly compressed between the shoulder 29 and the outer end of the coupling 20.

As is clearly shown in Figure 5, the resilient annular member 11 is deformed in the region of the orifice 17 when fluid under pressure is introduced in the bore 25 and is delivered through the bore 31 in the lower coupling member 26. The extent of the deformation of the resilient annular member 11 depends upon the pressure drop across the orifice 17, the greater the pressure drop the greater the deformation. It will further be observed that as the resilient annular member is deformed the size of the opening 17 at the upper surface of the member 11 decreases. It has been found in practice that by making the normal diameter of the orifice 17 of the resilient annular member 11 considerably smaller than the diameter of the marginal edge 18 of the shoulder 15 and by further shaping the opening in the wall portion 11 of the seat member 10 as shown, a substantially uniform rate of delivery may be obtained irrespective of wide variations in the pressure drop across the orifice 17.

In the copending application of Clyde A. Brown entitled "Flow control valve," U. S. Serial No. 493,530, filed July 5, 1943, now Patent No. 2,389,134, and assigned to the same assignee as the present invention, a flow control device is described and claimed employing a resilient annular member having a straight cylindrical orifice therein. In this copending application, however, the seat member is shown with a straight cylindrical opening therethrough. It has been found in practice that a more uniform and constant rate of delivery over wider variations in fluid pressure drop may be obtained by employing a seat member having a double frusto-conical opening therethrough of the type generally shown in Figures 1, 3, 4 and 5.

It has further been found that the rate of fluid delivery may be governed and determined by properly selecting the size of the opening in the resilient annular member 11 with respect to the diameter of the inner marginal edge of the shoulder 15.

In order to illustrate the control which the fluid control unit shown in Figures 1 to 5 of the drawings has over a wide variation in pressure, a chart of actual test data on a device of the type shown in Figures 1 to 5 is illustrated in Figure 8. Here the flow control unit was designed for delivering fluid at the rate of five gallons per minute over a range of pressure from 20 pounds per square inch to 150 pounds per square inch. Although this is an extremely wide variation in pressure, it will be observed that a substantially constant rate of delivery is maintained.

In Figures 6 and 7 of the drawings I have illustrated a modified form of the present invention. More particularly, I have shown therein a seat member 32 which includes a base portion 33 having a central opening formed by frusto-conical surface 34 and a second frusto-conical surface 35. The frusto-conical surface 34 extends further in a general axial direction than does the frusto-conical surface 35. It has been found, under certain circumstances, that a more constant and accurate control of the rate of flow may be maintained when this is done.

In the form of the invention shown in Figures 6 and 7 of the drawings, a resilient annular member 37 is provided having a central hole or bore 38. This is somewhat similar to the opening 17 of the resilient annular member 11 of the first embodiment of the invention, but in this particular form the opening 38 is made up of a cylindrical portion 39 and a frusto-conical portion 40. In other words, the opening 38 is slightly flared or counterbored adjacent the side of the resilient annular member 37 which is seated on the shoulder 41 of the seating member 32. The shoulder 41 is similar to the shoulder 15 of the first form of the invention and merges at its radial outer extremity in an axially extending flange or lip 42 within which the resilient annular member 37 fits. The resilient annular member 37 is held in place by the retainer ring 12 which is similar to that previously described. Figure 7 of the drawings clearly illustrates the seat member 32, the resilient annular member 37 and the retainer ring 12 in assembled relationship. These three members are retained preferably in some suitable form of housing, such, for example, as the coupling 20 shown in Figure 5. On the other hand, the retainer ring 12 may be secured in any convenient manner to the seat member 32 and thus provide a complete unit in itself comprising members 32, 37 and 12.

The predetermined constant rate of flow which is maintained by the present invention may be varied by varying the size of the central opening in the resilient annular member 11.

By way of illustration and not by way of limitation, a chart is shown in Figure 9 based on actual test records which indicates the rate of fluid delivery in gallons per minute for a flow control member of the type shown in Figures 6 and 7 of the drawings designed to deliver five and one-half gallons per minute over a variation in pressures from 20 pounds per square inch to 150 pounds per square inch.

While I have illustrated and described certain embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A fluid control device for maintaining a substantially uniform fluid delivery rate including a seat member having a central opening therethrough, said opening being defined by at least one frusto-conical surface, and a resilient annular member seated on said member over said opening, said annular member having a central opening therethrough substantially aligned with said opening in said seat member, said frusto-conical surface of said seat member which defines at least a part of said seat member opening being arranged to diverge toward said resilient annular member and terminating adjacent said resilient annular member at a point spaced radially outwardly from said opening in said resilient annular member, the central portion of said annular member being deflectable by fluid pressure into the frusto-conical portion of said seat member opening whereby to increase the area of the end of the opening in said annular member at the seat and to decrease the opposite end of said opening.

2. A fluid control device for maintaining a substantially constant rate of fluid flow including a seat member having a central opening therethrough, said opening being defined by a pair of frusto-conical surfaces of different predetermined degrees of slope, and a wafer of resilient material seated on said member over said opening, said wafer having a central opening therethrough substantially aligned with said seat member opening, the maximum transverse area of the opening in said seat member being adjacent said wafer and being substantially greater than the opening through said wafer, the central portion of said wafer being deflectable toward said surfaces in response to fluid pressure to taper the opening in the wafer for changing the fluid flow therethrough.

3. A fluid flow control device arranged to maintain a substantially constant rate of fluid flow irrespective of wide variations in fluid pressure comprising, a casing having a passageway therein through which a fluid is arranged to flow, a wall member of resilient material having an orifice therein disposed across the path of fluid flow within said passageway, said casing including a substantially rigid transverse wall portion for supporting said resilient wall member on its downstream side, said rigid wall portion having a generally tapered opening therethrough opposite said orifice which converges as it recedes from said resilient wall member, the edge of said opening adjacent said resilient wall member being spaced radially outwardly from said orifice whereby the central portion of said wall member can bend into said tapered opening in response to fluid pressure to vary the rate of flow through said orifice.

4. A fluid control device comprising a casing having a passageway therein, a shoulder in said passageway facing the inlet side of the passageway and extending radially inwardly from the side wall of the casing, an elastic member seated on said shoulder so as to extend radially toward the wall of said casing and having its outer periphery substantially radially confined beyond said shoulder so that the incoming fluid acts endwise against the member, said member having an orifice therethrough in a region of said member spaced inwardly of the radially inner edge of said shoulder to provide for flexing of the central portion of said member in a direction toward the outlet side of said passageway upon flow of fluid through said orifice, said shoulder being centrally recessed to receive the deflected central portion of said member, the opening in said member forming said orifice being enlargeable on the outlet side of the passageway and decreaseable in the area on the inlet side of the passageway upon deflection of said central portion in response to the pressure of the fluid acting endwise against said member.

5. The device of claim 4 further characterized by the recess in said shoulder being of generally a frusto-conical shape of such depth as to accommodate the central portion of the elastic member as it is deflected endwise out of the normal confines of the elastic member.

6. The device of claim 4 further characterized by the provision of means for embracing and confining the outer peripheral margin of said elastic member whereby the incoming fluid can be concentrated endwise on the central portion of the elastic member to deflect the same out of the normal confines of the elastic member and said means including a relatively rigid annulus on the inlet side of the elastic member for retainingly engaging the outer margin of said member to assist in holding said margin against radially inward displacement.

7. The device of claim 4 further characterized by the orifice in the elastic member being of a frusto-conical shape on its outlet side adjacent said shoulder.

LESLIE A. KEMPTON.

REFERENCES CITED

The following references are of record in the file of this patent:

UNITED STATES PATENTS

| Number | Name | Date |
| --- | --- | --- |
| 2,188,366 | Lindstaedt | Jan. 30, 1940 |
| 2,263,293 | Ewald | Nov. 18, 1941 |
| 2,389,134 | Brown | Nov. 20, 1945 |